Feb. 11, 1958　　　　F. T. SMITH　　　　2,822,738
ADJUSTABLE TRACTOR IMPLEMENT HITCH
Filed July 12, 1954　　　　4 Sheets-Sheet 1

INVENTOR.
FRED T. SMITH
BY
ATTORNEY

INVENTOR.
FRED T. SMITH
BY
ATTORNEY

United States Patent Office 2,822,738
Patented Feb. 11, 1958

2,822,738

ADJUSTABLE TRACTOR IMPLEMENT HITCH

Fred Thomas Smith, Golden, Colo., assignor, by mesne assignments, to The Calkins Manufacturing Company Application July 12, 1954, Serial No. 442,701

8 Claims. (Cl. 97—46.93)

My invention refers to a hitch adapted for mounting on a tractor and connection to a soil engaging implement at three spaced points.

Three point tractor hitches, utilizing a pair of laterally spaced draft arms disposed below an upper control arm, have been favored by users for several reasons, such as their ability to increase the traction of the tractor by transfer of weight, to plow with a constant draw bar pull on the tractor, and to lift and carry an implement. In instances where a constant depth of penetration is desired, rather than a constant draft force, it has been necessary in the past to utilize gauge wheels mounted on the implement. Since these wheels necessarily absorb some of the vertical forces acting on the implement, they deprive the tractor of a considerable portion of the weight or force otherwise transferred from the implement to the tractor, which is thereby deprived of a corresponding amount of traction. Several tractor implement hitches currently employed utilize linkages incorporating hydraulic members which transmit weight or force from the implement to the tractor, but the action of such members is relatively slow and, in addition, draws power from the engine which would otherwise be available for driving the wheels.

One of the primary objects of my invention is the provision of a tractor to implement hitch which will automatically maintain the depth of implement penetration into the ground substantially constant without necessarily employing a gauge wheel on the implement, and which at the same time transmits instantaneously to the tractor by wholly mechanical means a force which increases the tractive effort of the tractor in proportion to the draw bar load.

Another important object of my invention is the provision of a device of the type defined which may be utilized in connection with soil engaging implements having gauge wheels without sacrificing an important portion of the weight transfer otherwise available for transfer from the implement to the tractor.

A further important object of the invention is the provision of a tractor to implement hitch which automatically maintains a substantially constant depth of implement penetration during operation and which provides weight transfer from the implement to the tractor without appreciably changing the angle of the implement to the ground during its regulating movement.

Other objects, as well as many of the advantages of my invention will be more fully set forth in the following description and in the appended drawings, in which.

In brief, my hitch includes a pair of lower draft arms and an upper arm, all freely pivoted at their rear ends to an implement and at their forward ends to the frame of my hitch, which is secured to the tractor. Control of the depth of implement penetration, such as a plow, is secured by raising or lowering the forward ends of the lower links with respect to the frame; the action of the various components being such that as the points are raised the draft force acting on the implement causes it to also rise. Conversely, lowering these points causes an increase in the downward force acting on the implement, thereby increasing the depth of implement penetration.

To maintain substantially constant the depth of implement penetration, I transmit all changes in the relative vertical position of the implement from the lower control arms through a system of rigid levers to the pivot points at the forward ends of the lower arms, causing these points to raise or lower immediately a distance sufficient to fully compensate for and correct the change in vertical implement position. This corrective movement is accomplished by mounting on the frame of the hitch a freely pivoting bell crank or the like, having pendant rear link means pivoted to the rear portion of the lower arm and pendant forward link means pivotally connected to the forward portion of the lower arms. Thus, an upward movement of the implement immediately results in a positive downward movement of the forward end of the lower arm, which forces the implement downward to its intended depth.

Figure 2:
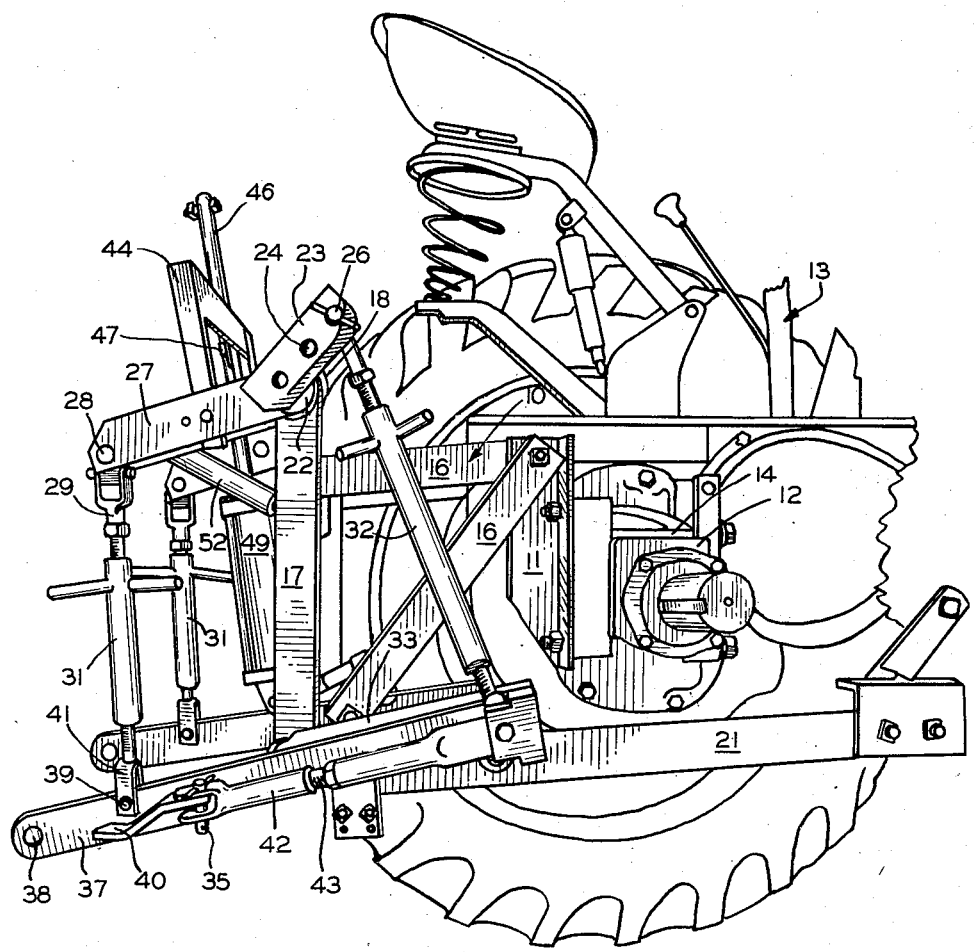
Fig. 2 is a partial perspective elevation of the device shown in Fig. 1.

Referring to the drawings, my hitch includes a frame, generally designated 10, of rigid construction and usually including legs 11 adapted to be clamped against an axle housing 12, or other suitable location, on tractor 13 as by bolts 14. Pairs of rearwardly projecting arms 16 17 which are in turn secured as by welding to an upper generally horizontal tubular section 18 and a lower tubular section 19. Additional support for the frame 10 may be obtained by connecting arm 21 at one end to the lower portion of the frame 10 and at its opposite end to the frame of the tractor, as shown in Fig. 2. Since tractors vary considerably in the means by which devices such as my frame 10 may be secured to the tractor, it should be understood that the connecting members 11, 16, and 21 may be arranged in any desired manner to provide rigid support for the generally rectangular upright portion of the frame 10 comprising the two spaced uprights 17, the upper tubular member 18, and the lower tubular member 19.

A shaft 22 extends through the upper tubular section 18 and supports a forwardly extending lever arm 23 containing a plurality of apertures 24 each adapted to receive and pivotally support a pin 26. The shaft 22 is also secured as by welding to a pair of rearwardly extending lever arms 27, each having pins 28 pivotally supporting universal joint means 29, which threadedly engage pendant adjustable rear links 31. A similar adjustable link 32 extends downwardly from the pin 26 in the lever arm 23.

Figure 1:
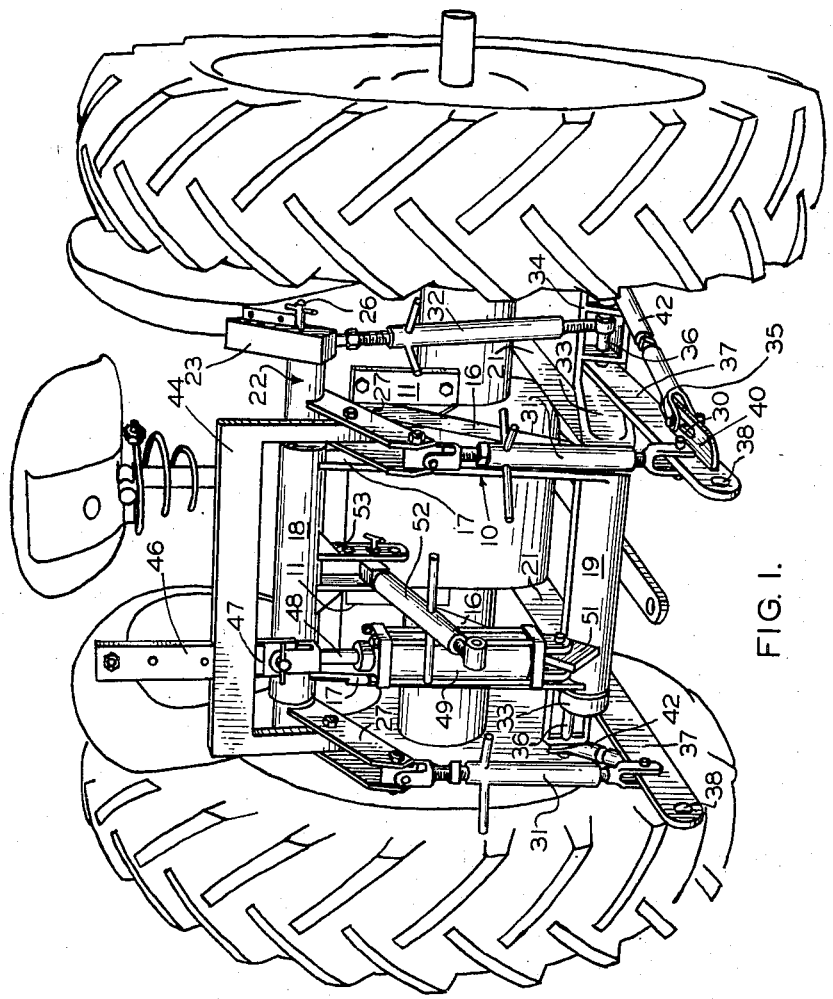
Fig. 1 is a perspective elevation of my tractor to implement hitch applied to a tractor.

The lower tubular support 19 pivotally supports a transverse shaft terminating in a pair of forwardly extending arms 33. Each of the arms 33 terminates at its forward end in a laterally extending member 34 including a generally horizontal stub shaft 36. The link 32 is pivotally secured at its lower end to the shaft 36, as best shown in Fig. 1.

Lower draft arms 37 are pivoted at their forward ends to the shafts 36 which fit loosely through holes formed in the arms 37 and permit movement of the arms in both a vertical and a horizontal plane. The arms 37 are also provided near their rear extremities with apertures 38 by means of which they may be pivotally secured to an implement. The links 31 are pivotally secured by pins 39 and clevises 41 to the arms 37 forwardly a short distance from the apertures 38. Adjustable arms 42 are pivotally secured at their forward ends to the shafts 36 and are also pivotally secured near their rear ends to the arms 37. The arms 42 are fabricated in two sections and threaded, as indicated at 43, to permit adjustment of length. The adjustment of these links determines the spacing between the arms 37 as well as the angular relationship between the arms 37 and the frame 10.

The pivotal connections between the rearward ends of the arms 42 and the arms 37 each include a pin 35 extending through the arm and a slot 30 in a bracket 40 secured to the arm 37. This lost motion linkage allows the arms 37 and the attached implement to move laterally when desired, as is necessary with certain implements, and also allows locking the arms 37 against lateral movement simply by lengthening the arms 42 until each of the pins 35 bears against the rear extremity of the slots in the brackets 40.

From the foregoing it will be noted that the forward end of each of the lower arms 37 can be raised or lowered by movement of the arms 33, which pivot in the tubular member 19. If the rearward end of the arms 37 is raised, the upward motion is transmitted by adjustable links 31 to lever arms 27 causing clockwise rotation of the shaft 22. This forces lever arm 23 downwardly, thus lowering the adjustable link 32 and the shafts 36 which constitute the forward pivot points of the arms 37.

Since the lever arms 23 and 27 are rigidly attached to the shaft 22, they form, in effect, a freely pivoted bell crank through which all regulating motion is transmitted. The links 31 and 32, being each of variable length, permit initial adjustment which determines the depth to which the plow or other implement will penetrate the soil as well as of the horizontal angle of the implement.

A yoke 44 is pivotally secured to the lever arms 27 and engages an upright slide 46 moving in guides and having a stop 47. The slide 46 pivotally engages a rod 48 reciprocably mounted in a hydraulic cylinder 49, which is in turn pivotally supported on an ear 51 secured to the lower tubular member 19. Actuation of the cylinder 49 from the tractor hydraulic system forces the slide 46 upwardly until the stop 47 engages the yoke 44. Further movement of the rod 48 will cause upward movement of the lever arms 27 and therefore of the lower control arms 37, thus lifting the implement from the ground. The cylinder 49 and its associated mechanism is utilized solely for lifting the implement and has no function whatsoever in control of the implement during operation. An upper control arm 52, preferably of adjustable length, is pivotally secured for free pivotal movement in a vertical plane to a pair of ears 53 which are in turn fastened, as by welding, to the upper tubular member 18.

In operation, the implement, such as a plow, is pivotally attached at three points to the lower arms 37 and the upper arm 52. Actuation of the cylinder 49 lifts the implement from the ground, thus permitting the tractor 13 to carry the implement to the field. The implement is then lowered until the stop 47 is well below the yoke 44. The desired depth of operation is selected by varying the lengths of the link 32, or by the position of the upper end of the link 32 in one of the several apertures 24. The action of my hitch is best understood by reference to Fig. 3, wherein I have illustrated diagrammatically the application of my hitch to a plow 54, to which a gauge wheel 56 may be applied. As previously described, the uprights 17 are secured firmly to the tractor, and pivotally support a centrally pivoted bell crank 57 having oppositely projecting arms 23 and 27. The uprights 17 also pivotally support arms 33 to which the forward ends of the lower arms 37 are pivoted. Rigid links 31 and 32 pivotally connect the bell crank 57 with the arms 37 and 33 as described.

Figure 3:
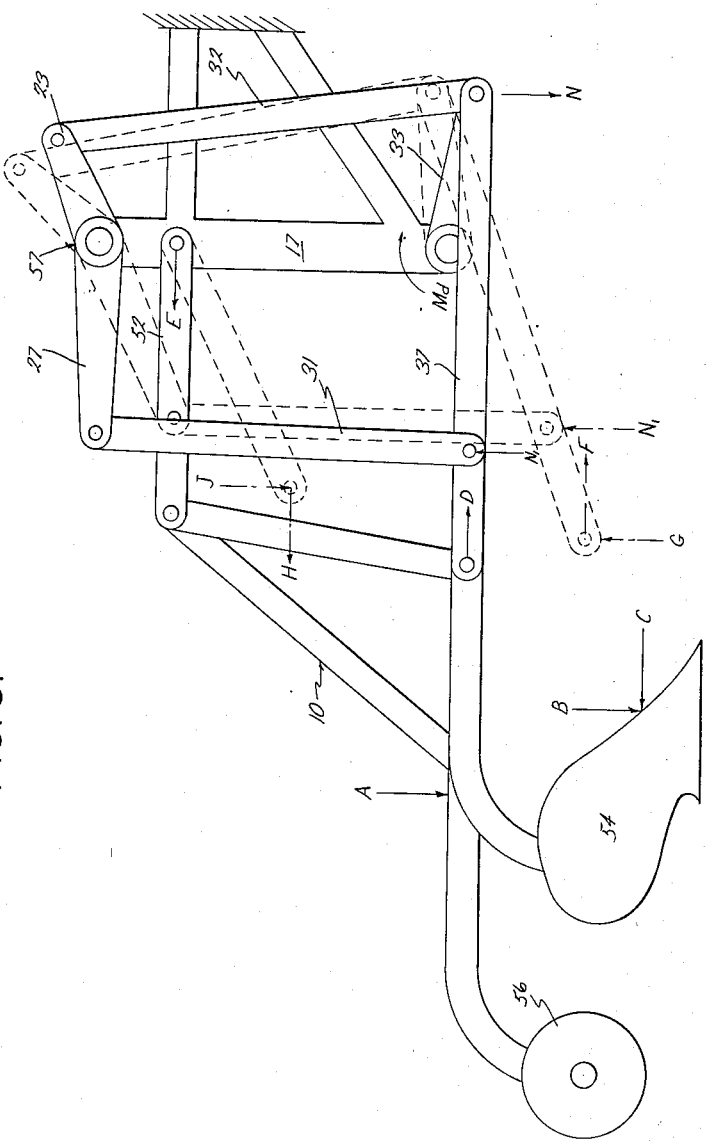
Fig. 3 is a diagrammatic representation of my hitch applied to a plow.
Figure 4:
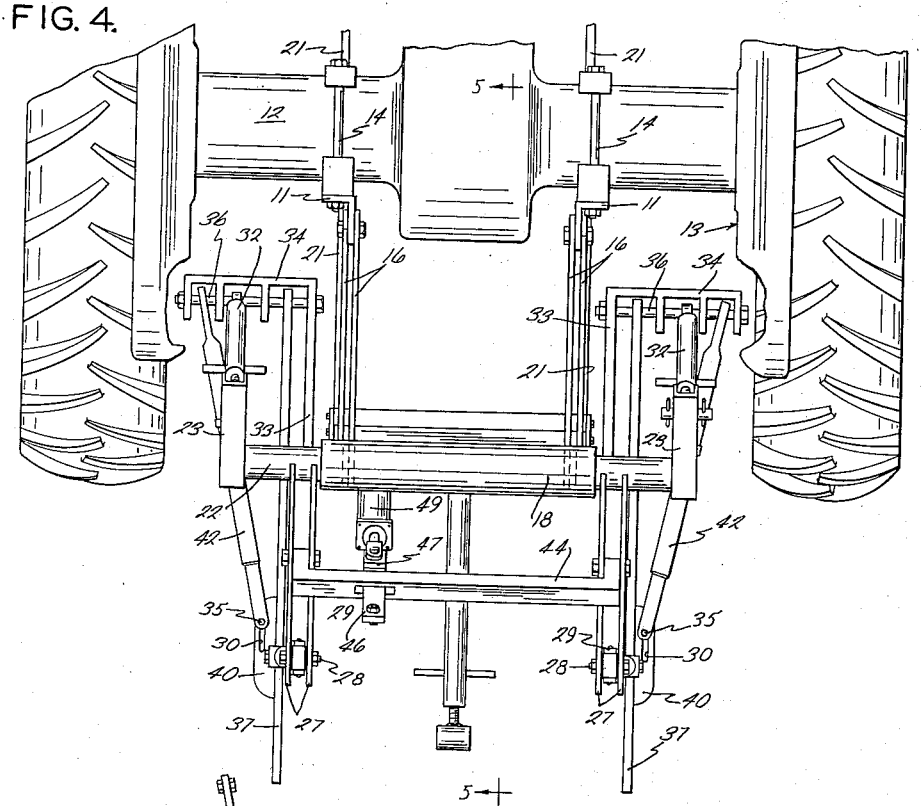
Figure 4 is a plan view of my hitch applied to a tractor.
Figure 5:
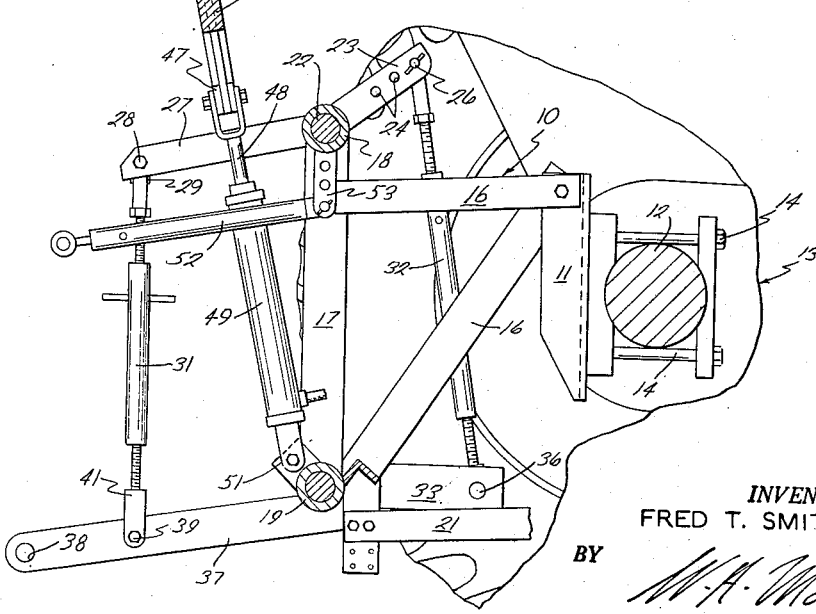
Figure 5 is a vertical sectional view taken on the line 5—5 of Figure 4.

In operation, the plow 54 enters the soil initially because of its weight, which is represented as force A in Fig. 3. This force is supplemented by the suction of the plow or force B, both of which drive the plow downwardly into the soil. The resistance to movement through the ground is represented as force C, acting against the plow 54. Force E, in the top link 52, opposes force C to prevent overturning of the implement and is proportional to force C. The forces C and E are balanced by force D in the lower draft arms 37 which is the draw bar force or pull of the tractor. Since the pivotal connection between the pivotal arms 33 and the uprights 17 is above and behind the pivotal connection between the draft arms 37 and the arms 33, the draw bar pull force D creates a moment $M_d$ about the pivotal connection between members 17 and 33 which acts clockwise as viewed in Figure 3. The moment $M_d$ creates a downward force N in the links 32 which force N is transmitted through bell crank 57 and links 31 as a lifting force $N_1$ on the draft arms 37. The force $N_1$ opposes forces A and B. Force $N_1$ may or may not be sufficient to overcome forces A and B. If not, additional counteracting force is obtained when forces A and B draw the plow 54 down and dispose the arms 37 at an angle to horizontal, thereby dividing force D into two components, horizontal component F and vertical component G, the force G increasing as the angle of arms 37 increases.

As the plow 54 moves downward, the arm 52 will also be disposed at an angle to horizontal, dividing force E into components H and J. As shown in Figure 3, force J also opposes force G. It will be understood, however, that the arm 52 may be connected to the plow 54 in such a manner that its rearward end lies above its forward end, in which case, force J will assist force G. The manner of connecting arm 52 will depend upon the nature of the particular implement used, and the results desired.

With the device arranged as illustrated in Figure 3, the plow will penetrate until the arms 37 have attained such a position that the relation $(G+N_1=A+B+J)$ exists. At this position equilibrium will be attained. The particular depth of penetration at the equilibrium condition will depend upon the adjustment of the links 31 and 32 and the angular disposition of the arm 52. It will be readily seen that lengthening or shortening the links 31 and 32 will result in depth adjustment.

The depth of penetration thus established is automatically maintained by my improved hitch, regardless of increased resistance and suction of the plow 54. For example, should the suction force B and the resistance force C increase, the pulling force D will also increase, thus increasing the moment $M_d$ and consequently the lifting force $N_1$. The increased lifting force $N_1$ will counteract the increased suction force B. Also, the increase in force D will increase the components F and G, and the increase in force G will oppose the increased suction force B. If the device is properly adjusted, there will be no increase in depth penetration. Conversely, should the resistance and suction forces B and C decrease, there will be a corresponding decrease in force D and therefore in moment $M_d$ and force N, and the depth of penetration will remain unchanged.

Since all forces are transmitted through rigid links levers, there is no time lag in the force transmission, so the corrective forces generated by the hitch act immediately to counteract the changing forces on the plow 54.

Gauge wheel 56 is neither necessary or desirable on conventional implements but becomes useful when the implement extends transversely a considerable distance. If employed my hitch is adjusted in such manner that the wheel 56 supports no weight when the plow is moving through the hardest portion of the soil at the desired depth. When softer soil is encountered the force C is, of course, reduced, which in turn reduces the value of force G. The gauge wheel 56 will under such circumstances support only the difference or change in the force G, which does not vary through a wide range. A transfer of weight to the tractor through the hitch is therefore decreased only by a minimum value.

It should be noted that during operation of my hitch, the attitude or approach angle of the implement to the ground does not vary appreciably, and control of the implement is not obtained by varying this angle. Furthermore, since the links 31 are secured to the arms 37 near their rearward ends, and since the arms 33 are of substantial length, the fore and aft movement of the arms 37 is very small, thus avoiding unnecessary disturbance of equilibrium or change in the operation of the implement.

It should not be assumed that my hitch is operative only with implements having a suction force B. On the contrary, implements such as disk harrows and the like, wherein the force B acts upwardly, may be utilized with my hitch as well as implements such as plows and the like. When implements having an upwardly directed force B are used, the hitch may be adjusted so that the draft arms 37 occupy a position above the pivotal connection between the uprights 17 and the arms 33, thereby reversing the direction of the moment $M_d$ and consequently reversing the direction of force N. In this event, force N will operate to force the implement into the ground. The arms 37 may also be aligned so that their rear ends lie above their front ends, thus also reversing force G. Thus forces G and N will oppose the upward force B and cause proper soil penetration.

The foregoing detailed description refers to a preferred embodiment of my invention, but it is to be understood that several modifications may be made in the structure described without departure from the intended scope of my invention. I do not therefore limit myself to the details set forth except so far as defined in the appended claims.

I claim:

1. A tractor to implement hitch comprising a hitch frame including means for rigid attachment to a tractor, a pair of spaced arms, each pivoted at one end to the hitch frame for simultaneous movement in a vertical plane and extending forwardly from the hitch frame, lower control arms pivoted at their forward ends to the other ends of said arms and having means near their rearward end for free pivotal attachment to an implement, an upper control arm freely pivoted to the hitch frame and having means near its rear end for pivotal attachment to the implement, bell crank means pivoted to the frame and having oppositely extending arms, first link means pivotally connecting the rear portions of the lower control arms to one arm of said bell crank means, and second rigid link means pivotally coupling the other arm of the bell crank means to the forward portion of the lower control arms, said bell crank and said links operable to raise the rearward portion of the lower control arms when the first named arms pivot downwardly with respect to the hitch frame.

2. The structure defined in claim 1 which includes means for varying the lengths of said links.

3. The structure defined in claim 1 which includes means for varying the position at which one of said link means is pivoted to an arm of the bell crank means.

4. The structure defined in claim 1 which includes means between the hitch frame and the bell crank means for rotating the bell crank means in one direction.

5. A tractor to implement hitch comprising a frame for rigid attachment to a tractor, a pair of lower control arms each having means near their trailing ends for free pivotal attachment to an implement, pivot means secured to the hitch frame for movement in a vertical plane and pivotally connected to the leading portions of the lower control arms for simultaneous movement, an upper control arm freely pivoted at its leading end to the hitch frame and having means near its trailing end for free pivotal attachment to an implement, lever means having oppositely extending arms and freely pivoted to the hitch frame, first rigid link means pivotally connecting one of said arms with a trailing portion of one of the lower control arms, and second rigid link means coupling the other of said arms to said pivot means, one of said link means being of variable length.

6. The structure defined in claim 1 which includes means for varying the length of said second rigid link means.

7. An implement hitch for tractors comprising a hitch frame having means thereon for attachment to a tractor, an arm pivoted to the hitch frame and extending forwardly, a draft arm pivoted to the forward end of the first named arm and extending rearwardly therefrom, said draft arm having implement connection means at its free end, bell crank means pivoted to the hitch frame, first link means pivotally connecting the rearward portion of the draft arm to the bell crank means, second link means pivotally connecting the forward portion of the draft arm to the bell crank, said bell crank and said links operable to raise the rearward portion of the draft arm when the first named arm pivots downwardly with respect to the hitch frame.

8. An implement hitch for tractors comprising a hitch frame having means thereon for attachment to a tractor, an arm pivoted to the hitch frame and extending forwardly, a draft arm pivoted to the forward end of the first named arm and extending rearwardly therefrom, said draft arm having implement connection means at its free end, and lever means on the hitch frame connected between said first named arm and said draft arm operable to move the rearward portion of the draft arm upwardly when the first named arm pivots downwardly with respect to the hitch frame.

References Cited in the file of this patent

UNITED STATES PATENTS

| | | |
|---|---|---|
| 2,398,365 | Ellis | Apr. 16, 1946 |
| 2,586,919 | Court | Feb. 26, 1952 |
| 2,640,708 | Fraga | June 2, 1953 |